Oct. 11, 1927.  G. E. GODDARD  1,644,826
SEPARABLE AUTO BODY CONSTRUCTION
Filed Jan. 29, 1923  6 Sheets-Sheet 1
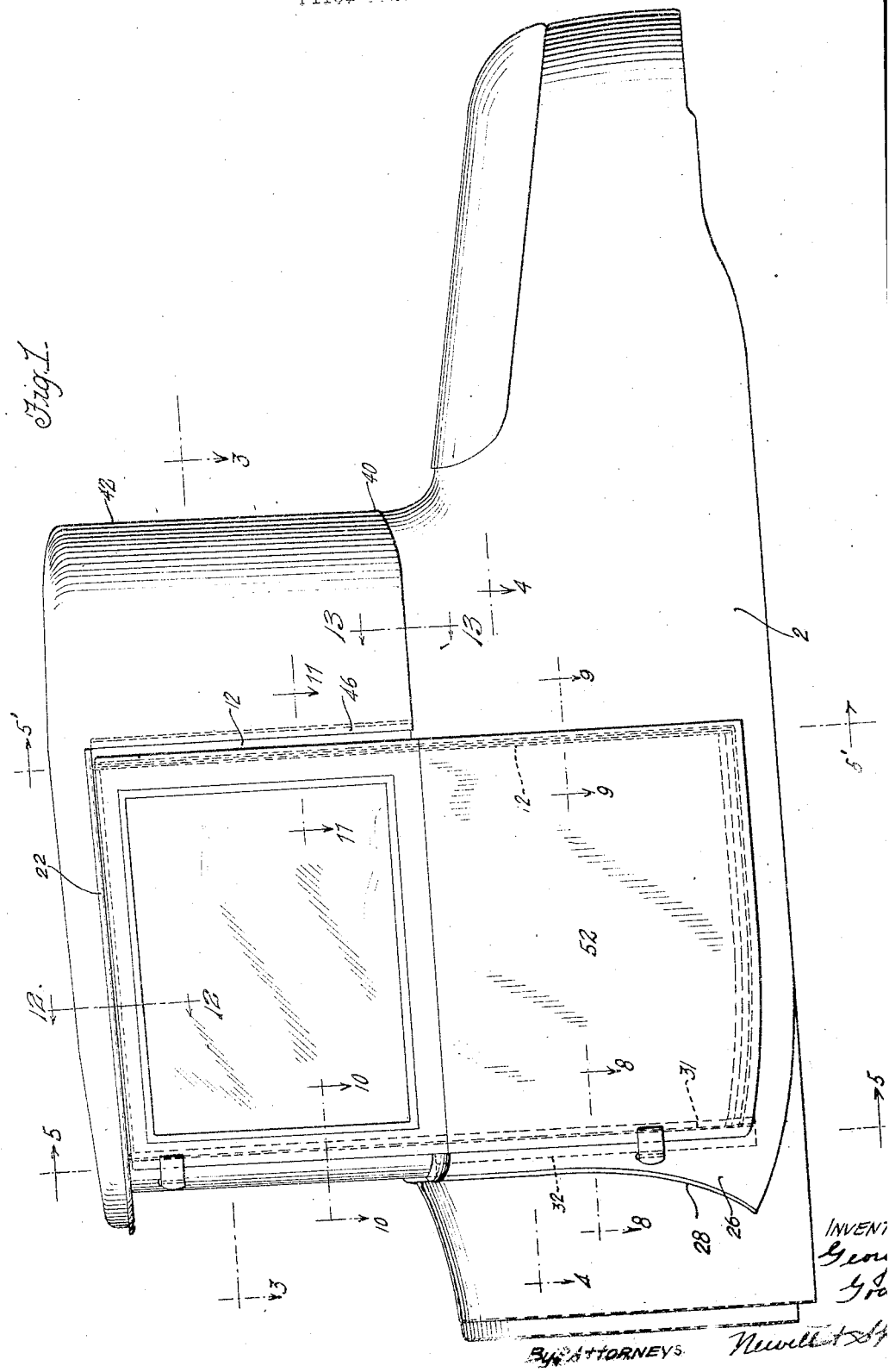

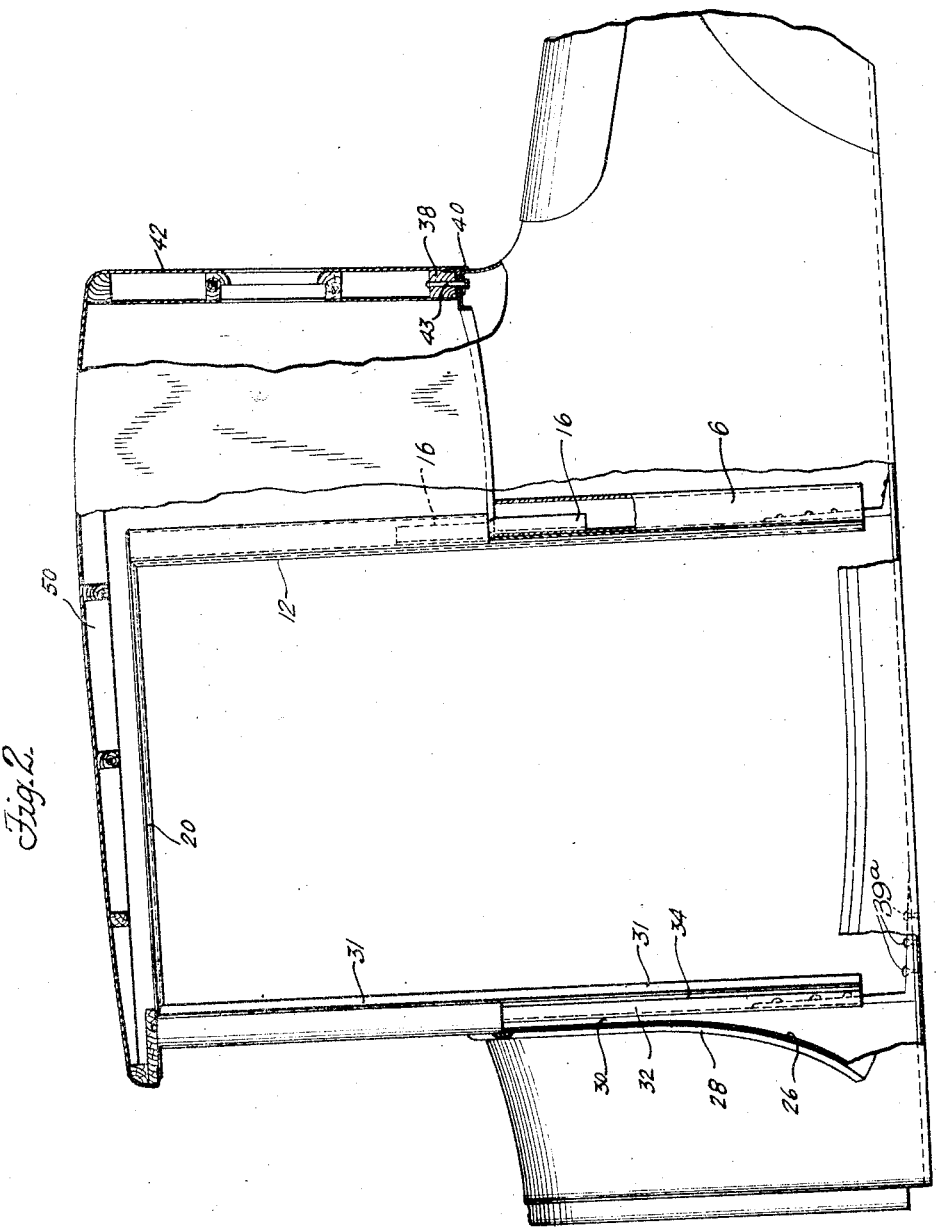

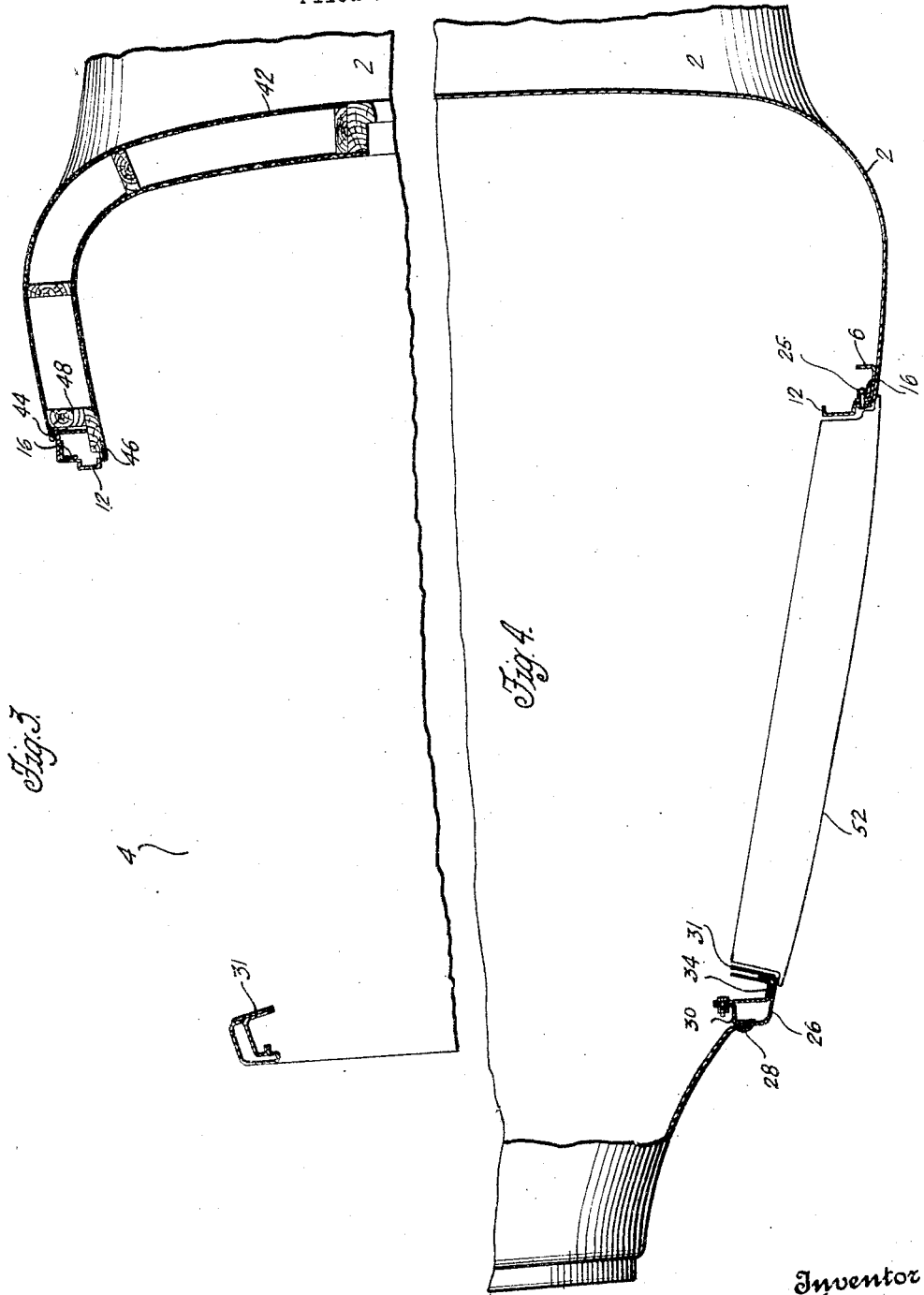

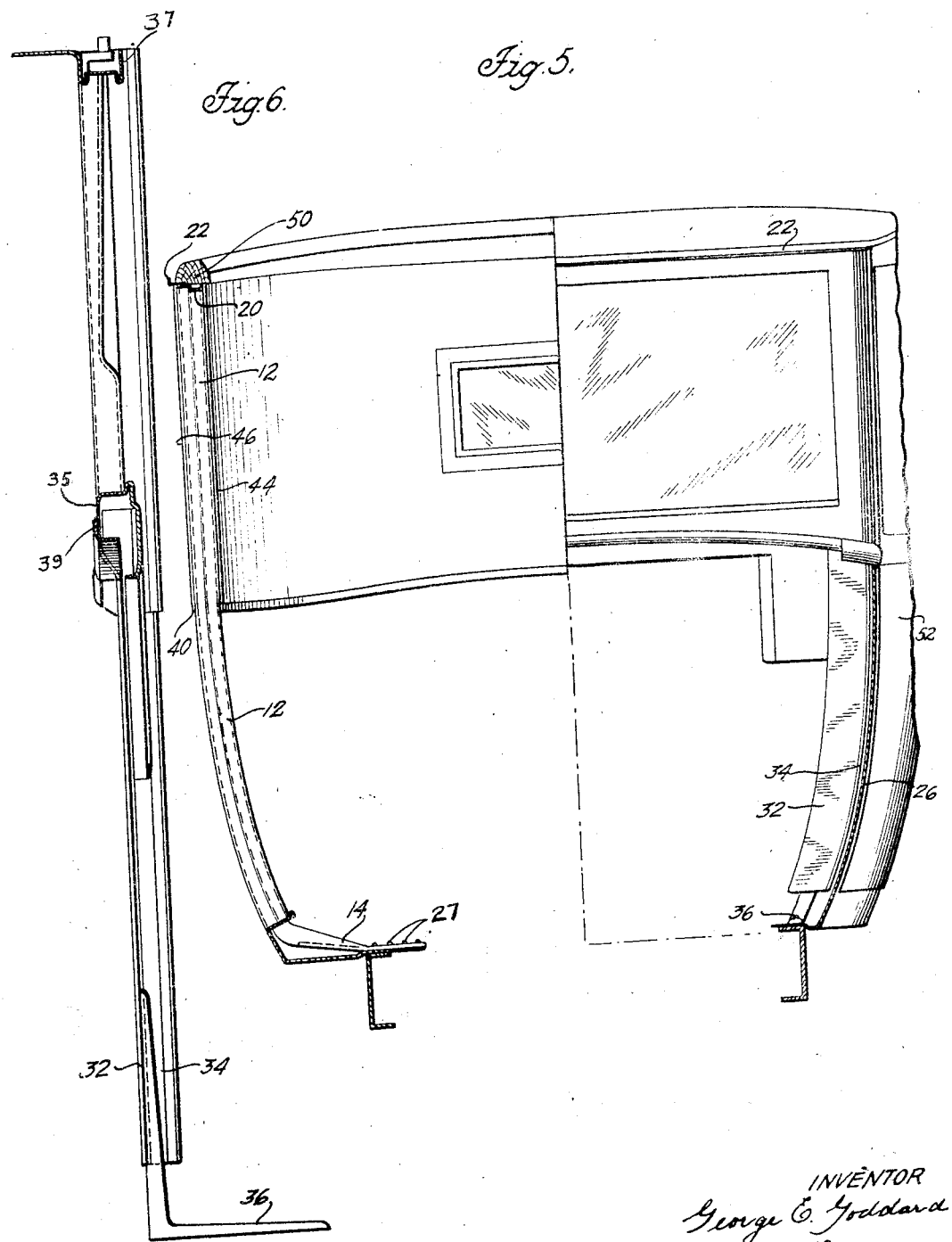

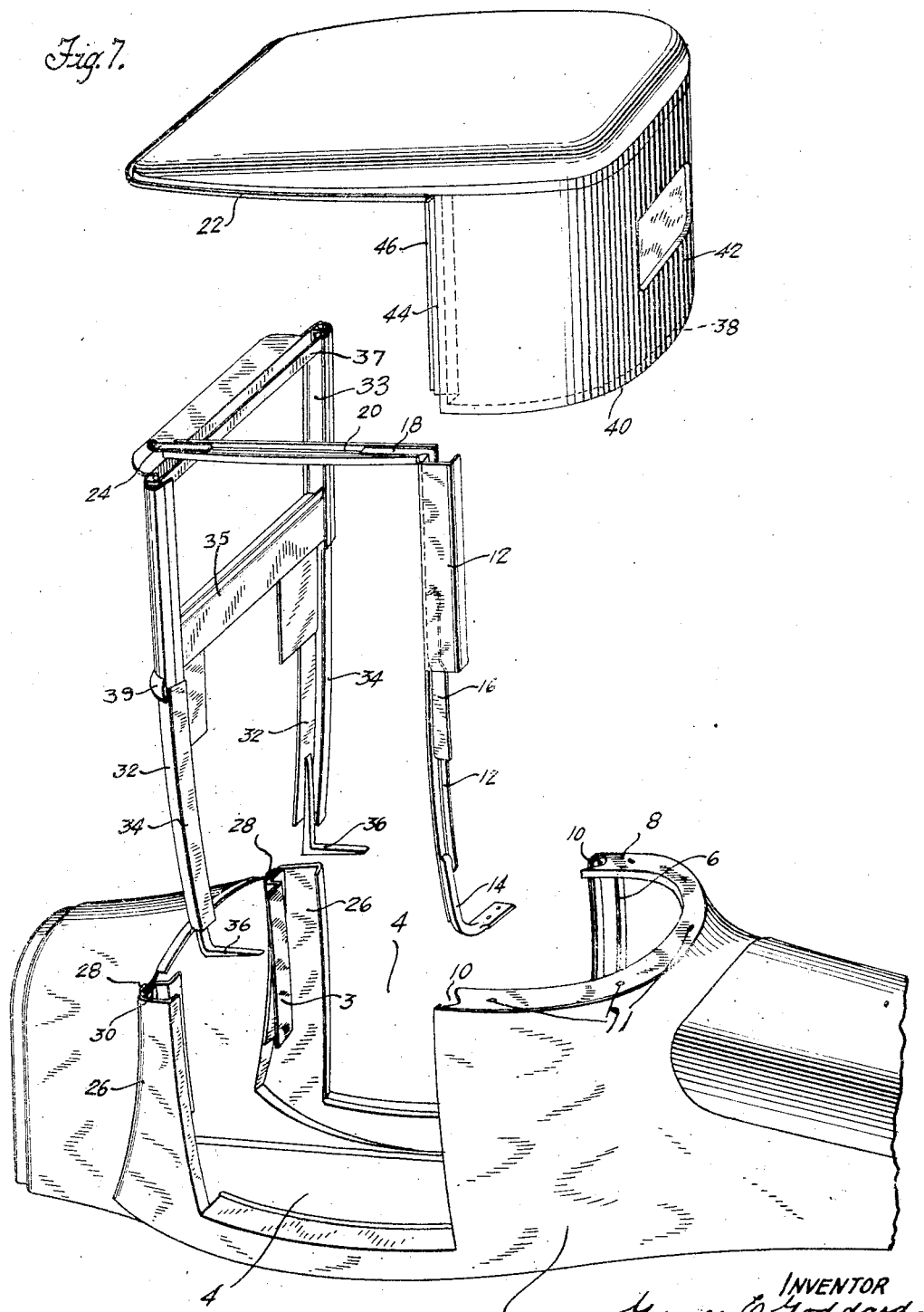

Oct. 11, 1927.  
G. E. GODDARD  
1,644,826  
SEPARABLE AUTO BODY CONSTRUCTION  
Filed Jan. 29, 1923  
6 Sheets—Sheet 6
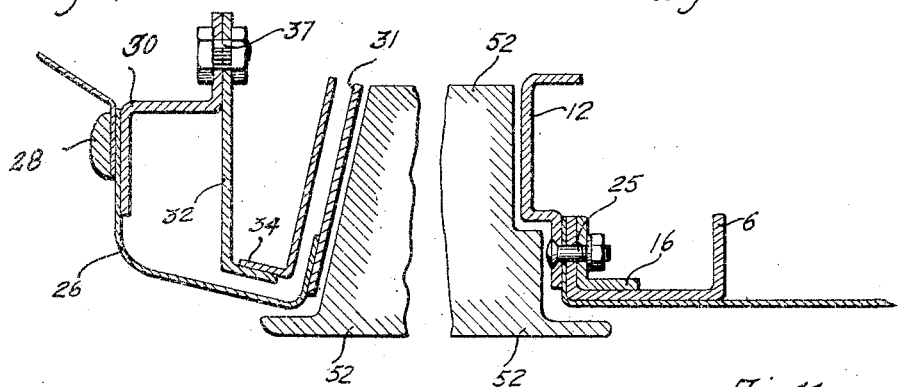
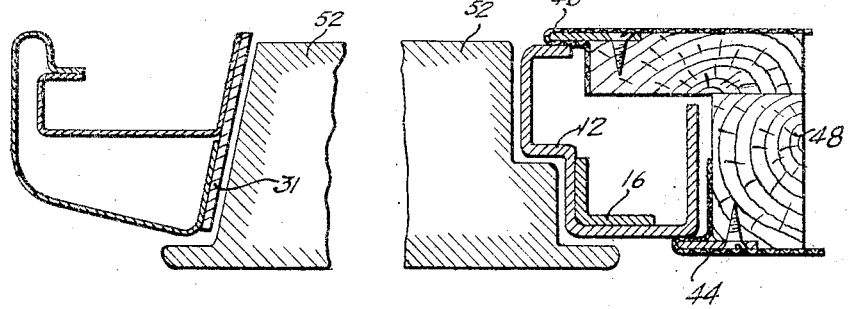
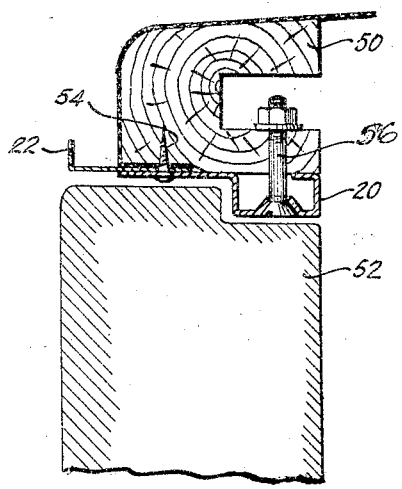
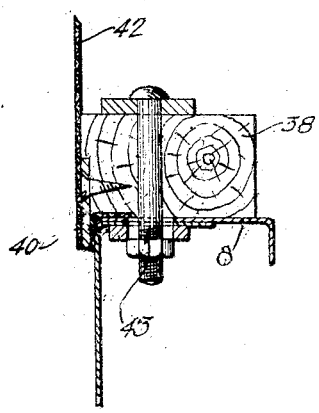
Inventor  
George E. Goddard  
By his Attorneys  
Newell & Spencer Patented Oct. 11, 1927.

1,644,826

UNITED STATES PATENT OFFICE.

GEORGE E. GODDARD, OF DETROIT, MICHIGAN, ASSIGNOR, BY MESNE ASSIGNMENTS, TO DODGE BROTHERS, INC., A CORPORATION OF MARYLAND.

SEPARABLE AUTO BODY CONSTRUCTION.

Application filed January 29, 1923. Serial No. 615,508.

This invention relates to an automobile body construction.

The principal objects of the invention are to improve the construction of automobile bodies and to produce an automobile body construction in which the parts may be more conveniently enameled or otherwise finished than in prior construction and in which the body may be shipped in knock-down form and readily assembled at its destination. Another object of the invention is to produce an automobile body constructed of units arranged to be shipped in knock-down form and afterward assembled, in which the parts of the units which are particularly liable to become scratched or disfigured in shipment will be covered so that they do not show in the finished automobile body.

With this and other objects in view the invention comprises novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1 is a view in side elevation illustrating an automobile body construction embodying the invention;

Fig. 2 is a view partly in side elevation and partly broken away of the body construction, certain parts being shown in section;

Fig. 3 is a view in horizontal section of a portion of the body taken substantially on the line 3—3 of Fig. 1;

Fig. 4 is a view in horizontal section of a portion of the body taken substantially on the line 4—4 of Fig. 1;

Fig. 5 is a view in vertical section taken in two different planes, one on the line 5—5 of Fig 1 and the other on the line 5'—5' of Fig. 1;

Fig. 6 is a view in vertical section of the windshield unit;

Fig. 7 is a perspective view of certain parts of the body ready for assembling;

Fig. 8 is a detail sectional view taken substantially on the line 8—8 of Fig. 1;

Fig. 9 is a detail sectional view taken substantially on the line 9—9 of Fig. 1;

Fig. 10 is a detail sectional view taken substantially on the line 10—10 of Fig. 1;

Fig. 11 is a detail sectional view taken substantially on the line 11—11 of Fig. 1;

Fig. 12 is a detail sectional view taken substantially on the line 12—12 of Fig. 1, and Fig. 13 is a detail sectional view taken substantially on the line 13—13 of Fig. 1.

In the present automobile body construction certain of the parts are assembled in units and these units are afterward assembled to complete the car body. As the invention is preferably carried out, certain parts are assembled to form what may be termed a car body proper unit; certain other parts are assembled to form a windshield unit; certain other parts are assembled to form the door-frame unit and still other parts are assembled to form a top unit. After these units are produced by the assembling of the proper parts, the various units are assembled in the proper relation to complete the formation of the car body.

As shown in the drawings of this application, the car body proper unit is indicated as a whole at 2 and comprises a framework preferably made of metal covered with the usual sheet metal sheathing. Certain parts of the car body unit differ materially from the usual construction to facilitate the assembling of the same with the various other units. As shown in the drawing, the car body is provided at the sides with the door openings indicated at 4 and at the rear of each door opening is an upright channel member 6, forming part of the framework of the car body. These channel members, 6, are surmounted by a plate at 8 extending about the upper portion of the car body unit at the rear of the seat space as shown in Fig. 7. This plate is adapted to receive the lower edge of the rear of the top unit and is provided at its opposite ends with notches 10 to receive an upright on each of the door frame units, these uprights being also received by the channel members 6, as hereinafter described. The plate 8 is provided with a series of bolt holes 11 to receive bolts for securing together the top and body proper units.

Each of the door frame units comprises an upright 12, the lower portion of which has substantially the cross-section shown in Figs. 4 and 9. To the lower part of this upright is attached preferably by welding, a footpiece 14 and to the intermediate portion of the upright is also welded an angle-bar 16, the angle-bar being attached at its upper portion only to the upright and having its lower portion offset and spaced from said upright as shown in said Figs. 7 and 9. The upper part of upright member 12 of the door frame has substantially the cross-section shown in Fig. 11 of the drawing. To the upright of the door frame is attached, by means of an angle bracket 18, a horizontal frame member composed of two parts indicated at 20 and 22, secured together and having the shape in cross-section shown in Fig. 12, the angle bracket preferably being welded to said upright and horizontal member. To one end of this horizontal member is attached by welding an arm 24 having an opening in its extremity to receive a pin on the wind-shield to connect the door frame with the wind-shield.

In assembling the door frame unit with the car body proper unit, the upright 12 is applied to the channel member 6 in the manner shown in Fig. 9, with the outer flange on the upright contacting with one of the flanges of the channel member 6 and with the angle-bar 16 nesting within the channel member, the foot-piece 14 resting upon the base of the car body as shown in Fig. 5. The upright on the door frame unit is secured to the channel member 6 by means of a series of bolts 25 (Fig. 9), and the foot-piece 14 on said upright is secured to the bottom of the car body by means of bolts 27.

At the forward side of the door openings 4, the body proper unit is preferably constructed with channels or guides to receive uprights which are formed on the windshield unit. As shown in the drawing, the car body unit forwardly of the door is provided with a channel member 26 secured, by welding, to the body of the car as shown in Fig. 8, a batten 28 being applied to the outer part of the car where this channel member overlaps the car body sheathing. To the inside of this channel member is welded an angle-bar 30 having the shape in cross-section shown clearly in Fig. 8 and secured to the channel member 26 as shown in this figure. To the flange on the other side of the channel member 26 is welded a plate 31, the angle bar 30, channel member 26 and the plate 31, thus forming a channel to receive one of the uprights on the wind-shield unit.

The wind-shield unit comprises two uprights upon the upper ends of which the wind-shield frame is mounted, these uprights being arranged to be inserted in the channels formed by the members 26, 30 and 31 of the car body unit.

The sides of the windshield frame indicated at 33, are formed by continuations of the two uprights. These side members are connected by a transverse frame member 35 forming the bottom member of the windshield frame, and the upper member of said frame is formed by a transverse member 37 connecting said side members. The lower part of the transverse frame member 35 is provided with an inwardly extending curved flange which fits over the rear edge of the cowl and a batten 39 is provided to cover the joint between certain of the parts. Each of the uprights upon which the windshield frame is mounted comprises two angle-bars 32 and 34 welded together at their overlapping flanges, the cross-section of these bars and the manner in which they overlap being clearly shown in Fig. 8. These uprights carry at their upper ends the wind-shield frame and are provided at their lower ends with foot members 36 consisting of angle-brackets, one arm of each of which is welded within the corresponding upright. The uprights on the wind-shield converge to a certain degree from their upper to their lower ends as clearly shown in Fig. 7, and the channels formed by the members 26, 30 and 31 correspondingly converge so that the uprights on the wind-shield will fit accurately therein. In assembling the wind-shield unit and the car body unit the uprights on the wind-shield are inserted in the channels formed by the members 26, 30 and 31 with the foot-piece 36 resting upon the bottom of the car body as shown in Fig. 2. The uprights on the wind-shield unit are secured to the angle bar 30 by means of a series of bolts 37 and the foot pieces 36 are secured to the bottom of the car body unit by means of bolts 39ª.

The top unit of the car consists of a framework which may be made of wood or metal or other suitable material and an outer sheathing preferably made of fibre, leather or imitation leather. As shown in the drawing the top unit is provided at the bottom of its rear portion with a curved frame piece 38 constructed to fit over the plate 8 on the body proper unit. The frame piece 38 of the top is provided with a series of bolt holes which register with the bolt holes in the plate 8 when the top unit is applied to the body proper unit, and the top unit is secured to the body unit by means of a series of bolts 43. The top is also provided with a curved plate 40 attached to the frame member 38 and extending downwardly slightly below the same so as to form an overhanging portion on the top extending slightly below the adjacent portion of the car body unit, as shown in Fig. 13, the outside sheathing on the top being indicated at 42 in this figure. The portion of the top unit at the rear of the door frame is constructed, as clearly shown in Fig. 11 of the drawing, so as to interfit with the corresponding portion of the upright on the door frame unit. The top also at this point carries plates 44 and 46 extending from the frame member 48 of the top so as to overlap the door frame upright as shown in this figure. Fig. 12 of the drawing shows the manner in which the top is fitted and secured to the horizontal member of the door frame unit, 50 indicating a frame member at the side of the roof portion of the top. The horizontal member of the door frame unit is secured to the frame member 50 of the top by means of a series of bolts 56 extending through the member 20, and a series of screws 54 extending through the member 22.

The manner in which the doors of the car are fitted to the door frame at the forward and at the rear margins of the doors is shown in Figs. 10 and 11; the door being indicated at 52 in these figures. Fig. 12 shows the manner in which the door fits the door frame at the top.

All of the parts of the wind-shield unit and the door frame unit and nearly all of the parts of the body proper unit are constructed of metal so that they may well withstand, without injury, the heat of an enameling oven. In the process of making the car body as preferably carried out, the parts of the car body proper unit, the door frame unit and the wind-shield unit are assembled before the enamel is applied to any of the parts. These units are then enameled and placed in the enameling oven. In the process heretofore ordinarily followed, each of the parts requiring an enamel finish is enameled before it is assembled with other parts, and the subsequent handling of the enameled parts in assembling the car has often resulted in injury to the finish. The several units of which the present car body is made up obviously may be assembled and secured together with comparatively little handling of the parts, so that there is very little liability that the enamel will be injured in this operation.

The enameling of the parts assembled in units also may be much more rapidly and conveniently accomplished than the enameling of each of the separate parts making up the body before they are assembled.

The present construction also has the marked advantage that the body may be shipped from the factory in "knocked-down" form or with the various units disassembled, and the units may be very readily assembled and secured together at the destination. When the units are in disassembled condition they may be arranged more compactly than in the assembled body, thereby saving considerable space in shipping. Furthermore, a large part of the exposed surfaces of the various units which are liable to become marred in shipment are covered when the units are assembled so that they cannot be seen in the finished car. Thus these surfaces do not require any special protection during shipment, and the care and time required in packing is greatly reduced. For example, the outer surfaces of the uprights on the windshield are covered by the channel members on the car body, and the plate 8 is covered by the frame member 38 on the top when these parts are assembled. It will also be noted that certain exposed parts of the door frame unit, the windshield unit and the top unit also are covered by the fitting of the units together. This may be clearly seen from an inspection of Figs. 8 to 10 inclusive of the drawings.

It is to be understood that the invention is not limited to the particular application or embodiment thereof illustrated and described in the foregoing description, but that the invention may be applied in other ways or embodied in other forms within the scope of the claims.

Having explained the nature and object of the invention, and having specifically described the manner in which the invention is preferably carried out, what is claimed is—

1. An automobile body construction having in combination, a body proper unit having door openings, and a curved plate extending about the upper part of the body unit at the rear of the seat location, a top comprising a roof portion and a rear portion extending about the rear of the top, and a plate at the base of said rear portion adapted to overlie and fit the corresponding plate in the body portion.

2. An automobile body construction having in combination, a body proper unit having door openings, and a curved plate extending about the upper part of the body unit at the rear of the seat location, a top comprising a roof portion and a rear portion extending about the rear of the top, a plate at the base of said rear portion adapted to overlie and fit the corresponding plate in the body portion, and a second plate secured to the top at the base of said rear portion and projecting downwardly below said first plate to produce an overhang of the top with relation to the body when the top and body units are assembled.

3. An automobile body construction comprising a top unit having a roof portion and a rear portion adapted to extend about the passenger space at the rear of the door openings, a door frame unit having an upright and a horizontal member, the frame members for the top adapted to interfit with said upright when the top unit and door frame unit are assembled, and means for securing said units together in assembled relation.

4. An automobile body construction, having in combination a body proper unit having channel frame members at opposite ends of the dash, a windshield unit having a windshield frame and uprights extending downwardly from said frame and arranged to fit within said channel members, and means to secure said uprights within said channel members to secure the windshield unit to the body unit.

5. An automobile body construction, having in combination a body proper unit having a channel member at the rear of the door opening, a door frame unit having an upright and a bar attached to said upright and spaced from said upright for a portion of the length of the bar, the upright and bar adapted to interfit with the channel member and to receive the channel member between them, and means to secure the upright and bar to the channel member to secure the body unit and door frame unit in assembled relations.

Signed at Detroit, Mich. this fifth day of January, 1923.

GEORGE E. GODDARD.